United States Patent [19]
Bard et al.

[11] 3,900,418
[45] Aug. 19, 1975

[54] ELECTROCHEMICAL LUMINESCENT SOLUTIONS AND DEVICES INCORPORATING SUCH SOLUTIONS

[75] Inventors: Allen J. Bard; Nurhan E. Takvoryan, both of Austin, Tex.

[73] Assignee: Bell-Northern Research, Ltd., Canada

[22] Filed: Apr. 12, 1973

[21] Appl. No.: 350,497

[52] U.S. Cl. ........ 252/301.2 R; 313/108 R; 313/358
[51] Int. Cl.² .................................. C09K 11/48
[58] Field of Search .......... 252/301.2 R; 313/108 R, 313/358

[56] References Cited
UNITED STATES PATENTS

| | | | |
|---|---|---|---|
| 3,440,173 | 4/1969 | Hovey et al. | 252/301.2 R |
| 3,503,893 | 3/1970 | Hercules et al. | 260/429 R |
| 3,539,941 | 11/1970 | Halverson | 252/301.2 R |
| 3,654,525 | 4/1972 | Maricle et al. | 313/358 |

OTHER PUBLICATIONS
Hercules (II), Current Status of Liquid Scintillation Counting, Greene & Stratton, N.Y., N.Y., 1970, pp. 320–327.

*Primary Examiner*—Arthur P. Demers
*Attorney, Agent, or Firm*—Craig & Antonelli

[57] ABSTRACT

Solutions for electrogenerated chemical luminescence comprise a luminescor and a solvent for the luminescor. An electrolyte, to make the solution electrically conducting, may also be present. The present invention is concerned with a new group of materials which can be used as the luminescor. Metal chelates meeting certain desiderata form efficient luminescors. Broadly such metal chelates can be defined as being fluorescent—that is fluoresce when irradiated by ultra-violet light for example—and having suitable oxidation states at all operating potentials—that is will provide stable ion radicals which will react with eventual production of light emission.

21 Claims, 2 Drawing Figures

ELECTROCHEMICAL LUMINESCENT SOLUTIONS AND DEVICES INCORPORATING SUCH SOLUTIONS

This invention relates to electrochemical luminescent solutions, and to devices incorporating such solutions. In particular this invention relates to such solutions in which the active constituent, that is the light emitting constituent, or luminescor, is a metal chelate, as hereinafter defined.

Electrochemical luminescence, or alternately referred to as electrogenerated chemical luminescence, referred to as ECL or EGCL for brevity, is a means for converting electrical energy into light, at low voltages, EGCL has been known for some time but metal chelates are a novel class of EGCL compounds, not previously used for such a purpose.

The present invention provides a solution for an EGCL device, usually referred to as a cell, the solution comprising a metal chelate dissolved in a conducting solution.

The metal chelate suitable for use as a luminescor may be defined in various ways. Thus, for example, the metal chelate must be a fluorescent metal chelate and have suitable oxidation states at cell operating potential. By a fluorescent metal chelate is meant a metal chelate which will luminesce when irradiated by a high energy source, for example ultra-violet light. By suitable oxidation states is meant the metal chelates will produce stable ion radicals, ie. anions and cations, which will react, or recombine, with eventual production of light emission.

Another way of defining such metal chelates is to say that the metal chelates, at the driving potential of the cell, should be capable of oxidation and reduction to stable ion radicals, recombination of the ion radicals resulting in the emission of light.

Defined by reference to driving potential of the cell, the driving potential should be capable of oxidizing or reducing the luminescor to stable ion radicals but not capable of oxidizing or reducing the luminescor to unstable radicals, or causing background discharge, i.e., causing decomposition of the electrolyte or solvent. The stable ion radicals must, of course, give rise eventually to light emission when they recombine or react.

An alternative way of putting the above definition is to say that the luminescor is a fluorescent metal chelate which has suitable oxidation states, ie. the provision of stable ion radicals, necessary for the reaction, the radicals produced at potentials which will not destroy the cell.

The cell is driven by an alternating current and the luminescor can again be defined as a metal chelate which, on alternate positive and negative going of the potential produces positive and negative ion radicals respectively, the radicals participating in a charge annihilation reaction in which part of the energy appears as an emission of light. Yet a further, rather brief, definition of a suitable metal chelate is one whose AC electrolysis results in it emitting light. Or, a metal chelate in which the redox reaction between anion and cation results in the emission of light.

Generally, all the various definitions require two parameters:- that is metal chelate luminescor be itself fluorescent (and this can be detected normally by ultraviolet light irradiation); and the metal chelate when in the solution shall be capable of producing stable ion radicals at the cell operating potential, the radicals taking part in a reaction in which excited states are formed and then annihilated, with eventual emission of light.

The operating potentials are quite low, the maximum being set by decomposition of the solvent and/or electrolyte, or by unstable decomposition of the luminescor. Typically, driving or operating potentials of about $\pm 1$ volt to $\pm 2$ volts are used. The actual potential used will depend upon, for example, the distance between electrodes, the area ratio between an electrode pair, the electrolyte and its concentration, solvent type, temperature, and the frequency of the applied voltage. The potential may be offset, that is it is not necessarily symmetrical about zero volts, swinging more positive than negative for example, or the reverse. In certain circumstances a direct current may be used but it has been found that using direct current does not normally produce efficient devices. Typical limits of frequency are from about 30 cycles per second up to several thousand cycles per second. The low limit is set by that needed to avoid flicker. The upper limit is set by the RC of the cell, where R = Resistance between the electrodes, and C = capacitance of the electrified solution interphase next to the electrode.

Several advantages accrue from the use of metal chelates. For example, EGCL cells can be provided which produce a red light —a desirable feature for some uses. It is possible to dissolve quite a large amount of the chelate in the solvent, giving high light outputs, the intensity being directly proportional to the concentration. Moreover the metal chelates generally exhibit good stability, often being more stable than other known luminescors.

Other advantages will be appreciated from the following description of certain embodiments, by way of example, in conjunction with the accompanying drawings which illustrate diagrammatically one form of a cell for producing EGCL in accordance with the present invention, and in which.

Figure 1:
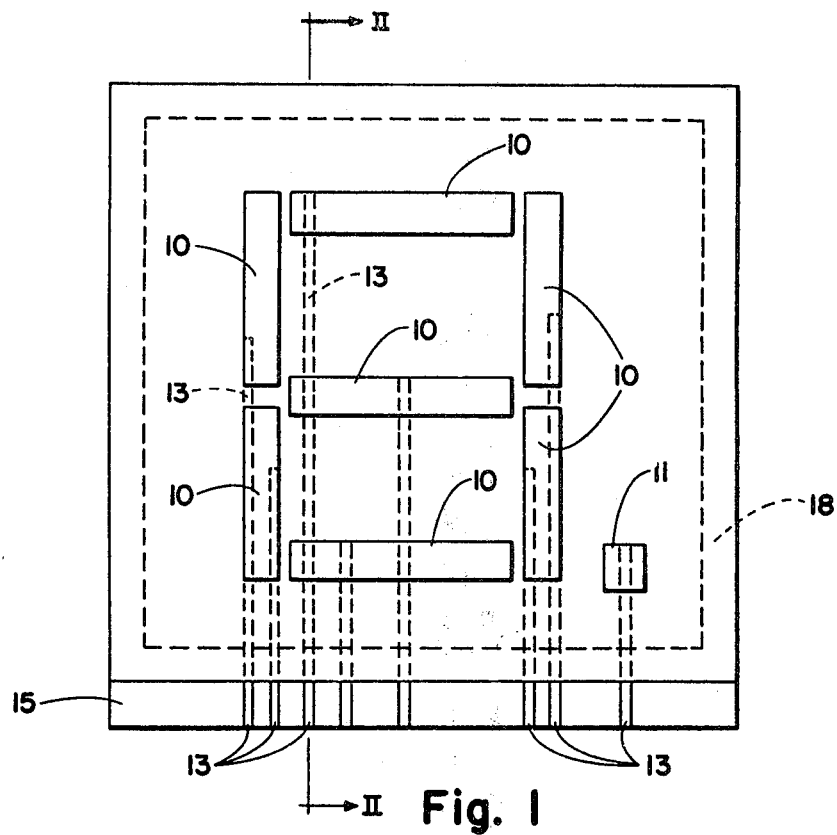
FIG. 1 is a plan view of one form of cell, as an example only.

EGCL is produced from an electrically conducting solution comprising a solvent, and a luminescor. An electrolyte is usually also included to provide electrical conductance, but as described later is not always essential. Three metals which form EGCL chelates —which act as the luminescors— are platinum metals Ru, Pt and Pd. These elements have unfilled $d$ orbitals. As a solvent, aprotic solvents can be used, and as an electrolyte electroinactive organic compounds can be used.

Taking as a particular example ruthenium (Ru), three Ru(II) chelates are:

$RuL_x{}^{n+}$ [$x = 3$, $n = 2$, L-bipyridine (bipy); $x = 3$, $n = 2$, L = 1, 10-phenanthroline (o-phen); $x = 2$, $n = 2$, L = 2, 2',2''-terpyridine (terpy)]. These chelates can be used in acetonitrile solutions, and for convenience are referred to as bipy, o-phen, and terpy respectively.

Two further examples, for Pt and Pd, are:

Pt (II) ($\alpha,\beta,\gamma,\delta$,-tetraphenylporphin) and Pd (II) ($\alpha,\beta,\gamma,\delta$,-tetraphenylporphin). Aprotic solvents and electroinactive electrolytes are used, as for Ruthenium.

A typical solvent is acetonitrile, with tetra-n-butylammonium perchlorate as electrolyte.

The various constituents of the solutions can be generally characterized although there are likely to be preferred ones of such groups. Thus for example the solvent can be generally referred to as aprotic, and typical examples of such solvents are: Dimethylformamide (DMF); Acetonitrile; Benzonitrile; Propylene Carbonate; Dimethyl sulfoxide. Mixtures of these solvents can be used and also additives such as Benzene, Toluene or any of the Xylenes can be used, both with single ingredient solvents and mixed solvents. The deciding factor in using additives is that there be sufficient aprotic solvent to dissolve sufficient electrolyte to maintain the desired electrical conductivity of the solution.

Electrolytes can be referred to as organic electrolyte and typical examples are Alkylammonium perchlorates; Alkylammonium fluorborates; and Alkylammonium toluene sulphonate. The electrolyte is required to dissociate in the solution and not be electroactive in the operating potential range of the cell, that is not reduced or oxidized, and only migrates to maintain charge balance. However, as explained below, in the present invention a separate electrolyte is not always needed.

The electrode is generally of a noble metal; typical examples are platinum, gold rhodium and palladium. The electrodes are universal in that any of these electrode materials can be used with any EGCL solution.

As previously stated, some electrolytes are better than others and it has been found preferable to use the perchlorate or fluorborate, rather than the chloride or bromide, when electrolytes are required. Also it has been found advantageous that the anion of the chelate salt should be the same as the anion of the electrolyte.

The use of additives to the solvents can improve the cell efficiency in that a higher proportion of luminescor can be dissolved. Thus the efficiency is increased by the addition of a low dielectric component to the solution in the cell. As stated above typical additives are: Benzene, Toluene and any of the Xylenes. However, also as stated above, there is a limit to the proportion of additive as the solvent is instrumental in dissolving the electrolyte, in addition to the chelate luminescor, and there must be sufficient solvent in the solution to dissolve the electrolyte to maintain solution conductivity, where an electrolyte is used.

The solution should be free of $O_2$, water and also free of any other electroactive material apart from the chelate luminescor. The chelate should be the most readily oxidized or reduced constituent of the solution. The cell should be hermetically sealed and of electrochemically and chemically inert materials.

A solution for a cell is prepared generally as follows. First the purity of the constituents is assured. If necessary the constituents are processed to ensure purity -particularly freedom of oxygen and water, and also other electroactive impurities. Typically the solvent, for example acetonitrile, is prepared by passing through alumina. The moisture content is reduced by the alumina to below 1 part in $10^5$. The oxygen content is reduced to below 5 parts in $10^5$ by outgassing in which the solution is stirred while under a subatmospheric pressure —a well-known procedure. The electrolyte, for example an alkylammonium perchlorate, is prepared as necessary by recrystallization in pure alcohol. Recrystallization can be carried out several times if necessary. Activated carbon black can be added to dissolved raw material to take out impurities. The crystals are vacuum dried —preferably in a nitrogen atmosphere- at a temperature of 140°–160°C. The moisture content is reduced, for example, to below 1 part in $10^6$.

The luminescor is also purified, as necessary, by recrystallization —repeated several times. A typical purification process is as follows: One gram of the chloride salt of the metal chelate is dissolved in 50ml of absolute ethanol and then filtered into 1.3gm of sodium perchlorate. The mixture is stirred to facilitate the dissolution of the sodium perchlorate. The product of this reaction is a red solid. This solid is then filtered off and redissolved in fresh solvent to wash it of occluded reactant. Finally, it is filtered and dried at 120°C in 1mmHg nitrogen for a few hours. Except as otherwise stated, purification is carried out at room temperature.

The solution is then prepared by dissolving the luminescor in the solvent, and the electrolyte, if any, added. A typical example of a solution is 1 millimolar of chelate and 100 millimolar of electrolyte in an acetonetrile solvent. The solution is prepared at room temperature and should be stored in a dry box or similar storage prior to use. A further example, using DMF as a solvent, is approximately 6 millimolar of chelate and 100 millimolar of electrolyte.

An example of an electrode is platinum and a potential of the order of ±2 volts (4 volts square wave peak to peak) applied. Application of the alternating potential results in the alternative production of an oxidized form and a reduced form of the chelate at a particular electrode —an oxidized form on the positive potential swing and reduced form on the negative potential swing. The oxidized and reduced form participate in an annihilation reaction whose enthalpy is dissipated as visible light.

The amount of electrolyte in the solution can be varied —the practical limits seeming to be between 10 and 200 millimolar. The lower limit is set by conductivity of the solution and the higher limit by the solubility. While the proportion of luminescor —chelate— in the solution can be varied, the upper limit is set by solubility. It is desired to have a relatively high proportion of luminescor as this is directly related to light emission. The proportion of luminescor depends to some extent on the particular solvent. Also, as stated, the use of an additive to the solvent, or a mixed solvent, increases solubility of the luminescor. Proportions up to approximately .1 molar of luminescor can occur, dependent upon solvent temperature and other factors. As stated, while normally a solution has three constituents or components: luminescor, solvent for the luminescor, and an electrolyte to make the solution electrically conducting, it may not be necessary to use an electrolyte in many examples. When dissolved in the solvent, metal chelates which are salts, and as defined herein tend to produce electrically conducting solutions without the further addition of a specific electrolyte. Thus the perchlorate salt of bipy (referred to above) with DMF as the solvent does not need an electrolyte as such, although a specific electrolyte may be added.

The proportions given are applicable to all the examples given, that is for ruthenium examples and the platinum and palladium example, and also to other metal chelates not specifically referred to. Also the proportions are effective for the solvents —single or mixed— and the electrolytes. A red or orange emission is obtained with the above particular examples.

As stated the presence of oxygen and/or water in the solution has an adverse effect on the efficiency of a cell. It is therefore at least advisable to prepare the various constituents in a manner which reduces the occurrence of oxygen and water, and to avoid as far as possible contamination of the prepared constituents after preparation and before use. Again access of oxygen or water to the solution in a cell should be avoided.

Where the raw materials are purified by recrystallization, this should be done by using anhydrous solvents.

It has been found that, of the examples described, the bipy ruthenium chelate is most efficient. An efficiency of 5–6% has been attained, that is approximately 20 Faradaic electrons produce one photon of light. Cells using the solutions of the present invention operate effectively at room temperature and have long stable lives. The intensity of the light emission is sufficient for a cell to be readily visible in a normally lighted room.

A particular use of EGCL is for a segmental array. The invention is useful for cells used for many other purposes but a segmental array cell is a convenient example.

Figure 2:
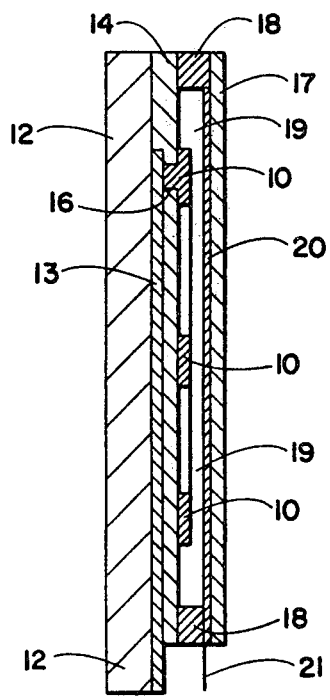
FIG. 2 is a cross-section on the line II—II of FIG. 1.

FIGS. 1 and 2 illustrate, in a very diagrammatic form, one type of EGCL segmented array cell. In particular, the cell is drawn to an enlarged size in order to show details clearly. The cell in the drawings is for a numerical display array, the array formed by seven segments 10 in the usual manner. By energizing selected segments any numeral desired can be caused to be visible. A further segment 11 can be provided for a decimal point. The array is built up on a ceramic support plate or substrate 12. The electrical conductor leads 13 for the segments 10 and 11 are deposited or formed on the substrate 12 and a layer of dielectric 14 then applied over the substrate, leaving uncovered only the edge 15 of the substrate at which the leads 13 emerge. Holes 16 are formed through the dielectric layer 14 at positions relating to the corresponding segment positions and then electrode material, for example platinum, is deposited to form the array segments 10 and 11. The electrode material contacts with the leads 13 via the holes 16. A cover 17 of glass is then positioned over the array, spaced by a thin spacer 18, for example of polyethylene. The glass cover 17, spacer 18 and dielectric covered substrate 12 are bonded together to form a closed container. The space 19 is filled with a solution, for example as detailed above, that is acetonitrile as a solvent, tetra-n-butylammonium perchlorate (TBAP) —an alkylammonium perchlorate— as electrolyte and Bipy-Ruthenium chelate as luminescor. The glass cover has a transparent electrode 20 applied to its inner surface and an electrical lead 21 is connected to this electrode. The electrode 20 is of tin oxide for example and is shown more exaggerated in thickness in FIG. 2.

In a modified form of cell, not illustrated, both electrodes can be formed on the same support plate. In an array as in FIG. 1, for example, it is possible to form the counter electrode, the electrode 20 in FIG. 2, on the substrate 12. This electrode would be, for example, in the spaces bounded by the segments 10, with small isolating gaps between the segments and counter electrode.

The array illustrated in the drawings is only one example of an EGCL cell. Such cells can be very large and have a very complex array or pattern of display matter. The materials of a cell are relatively cheap and large units can economically be made. In addition to small units such as can be used for displaying information and the like for calculators and other similar apparatus, large units can be made for the display of, for example, advertising matter, progression flow charts in processing plants and other material.

A typical driving voltage for a device as in FIGS. 1 and 2, is 4 volts peak to peak. For a device as illustrated, having a size approximately ⅓ inch square, the current is approximately 7 milliamps. Typically, devices are operated at room temperature, although devices as described are capable of operation at temperatures above and below room temperature.

What is claimed is:

1. An electrically conducting electrochemical luminescent solution for use in an electro-generated chemical luminescent device operating at a predetermined potential, said solution comprising a fluorescent metal chelate luminescor, an aprotic solvent for said metal chelate, and an electrolyte comprising an organic compound electroinactive at said potential, said metal chelate being capable of producing stable ion radicals at said predetermined potential, the radicals taking part in a reaction in which excited states are formed and then annihilated with eventual emission of light, said solution being substantially free of $O_2$ and water, said chelate being the most readily oxidized or reduced constituent in said solution, the metal component of said chelate being selected from the group consisting of ruthenium, platinum and palladium and the ligand component of said chelate being selected from the group consisting of bipyridine, 1,10-phenanthroline, 2,2′2″-terpyridine and tetraphenylporphin.

2. The solution according to claim 1, wherein said metal chelate is selected from the group consisting of
$RuL_x^{n+}$ where $x$ is 3, $n$ is 2 and L is bipyridine;
$RuL_x^{n+}$ where $x$ is 3, $n$ is 2 and L is 1,10-phenanthroline;
$RuL_x^{n+}$ where $x$ is 2, $n$ is 2 and L is 2,2′2″-terpyridine;
Pt (II)$\alpha,\beta,\gamma,\delta$ - tetraphenylporphin; and
Pd (II)$\alpha,\beta,\gamma,\delta$ - tetraphenylporphin.

3. The solution according to claim 2, wherein said solvent is selected from the group consisting of dimethylformamide, acetonitrile, benzonitrile, propylene carbonate, dimethyl sulfoxide, and methylenechloride.

4. The solution of claim 2, wherein the amount of said metal chelate in said solution is sufficient to produce visible light when said solution is subjected to said potential.

5. The solution of claim 4, wherein the amount of metal chelate in said solution is up to about 0.1 molar.

6. The solution of claim 3, wherein the concentration of said electrolyte in said solution is about 10 to 200 millimolar.

7. The solution of claim 6, wherein the organic electrolyte is capable of dissociating in said solution, said electrolyte remaining unreduced and unoxidized under the influence of the operating potential in said cell.

8. The solution of claim 6, wherein said electrolyte is selected from the group consisting of alkylammonium perchlorate, alkylammonium fluoroborates, and alkylammonium toluene sulphonate.

9. The solution of claim 8, further including an additive selected from the group consisting of benzene, toluene, and xylene, the amount of additive, chelate and solvent in said solution being sufficient so that the conductivity of the solution is maintained.

10. The solution of claim 9, wherein the proportion of metal chelate in said solution is up to about 0.1 molar.

11. The solution of claim 1, wherein the proportion of metal chelate in said solution is up to about 0.1 molar.

12. The solution of claim 1, wherein the concentration of said electrolyte in said solution is about 10 to 200 millimolar.

13. The solution of claim 12, wherein said electrolyte is selected from the group consisting of alkylammonium perchlorate, alkylammonium fluoroborates, and alkylammonium toluene sulphonate.

14. The solution of claim 13, further including an additive selected from the group consisting of benzene, toluene, and xylene, the amount of additive, chelate and solvent in said solution being sufficient so that the conductivity of the solution is maintained.

15. The solution of claim 1, wherein said metal chelate is $RuL_x^{n+}$ where $x$ is 3, $n$ is 2 and L is bipyridine.

16. The solution of claim 1, wherein said solvent is acetonitrile, said chelate is $RuL_x^{n+}$ where $x$ is 3, $n$ is 2 and L is bipyridine, and said electrolyte is tetra-n-butylammonium perchlorate.

17. The solution of claim 16, wherein the concentration of the chelate is about 1 millimolar and the concentration of the electrolyte is about 100 millimolar.

18. The solution of claim 1, wherein the amount of said metal chelate in said solution is sufficient to produce visible light when said solution is subjected to said potential.

19. The solution of claim 1, wherein the moisture content of said solvent is below about 1 part in $10^5$ and the oxygen content is below about 5 parts in $10^5$.

20. The solution of claim 1, wherein said predetermined potential is about 2 volts.

21. A process for producing light comprising applying an electrical potential between two electrodes in contact with an electrically conducting electrochemical luminescent solution including a metal chelate having suitable oxidation states at cell operating potentials such that when in solution said chelate is capable of producing stable ion radicals at said operating potential, the radicals taking part in a reaction in which excited states are formed and then annihilated with the eventual emission of light, said electrochemical-luminescent solution comprising a fluorescent metal chelate luminescor, an aprotic solvent for said metal chelate, and an electrolyte comprising an organic compound electroinactive at said potential, said metal chelate being capable of producing stable ion radicals at said predetermined potential, the radicals taking part in a reaction in which excited states are formed and then annihilated with eventual emission of light, said solution being substantially free of $O_2$ and water, said chelate being the most readily oxidized or reduced constituent in said solution, the metal component of said chelate being selected from the group consisting of ruthenium, platinum and palladium and the ligand component of said chelate being selected from the group consisting of bipyridine, 1,10-phenanthroline, 2,2'2''-terpyridine and tetraphenylporphin.

* * * * *